(12) United States Patent
Yadav

(10) Patent No.: US 8,263,685 B2
(45) Date of Patent: *Sep. 11, 2012

(54) NANO-ENGINEERED INKS, METHODS FOR THEIR MANUFACTURE AND THEIR APPLICATIONS

(75) Inventor: Tapesh Yadav, Longmont, CO (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/050,361

(22) Filed: Mar. 17, 2011

(65) Prior Publication Data

US 2011/0166289 A1 Jul. 7, 2011

Related U.S. Application Data

(63) Continuation of application No. 10/536,323, filed as application No. PCT/US03/37635 on Nov. 25, 2003, now Pat. No. 7,914,617.

(60) Provisional application No. 60/429,695, filed on Nov. 27, 2002.

(51) Int. Cl.
*C08K 9/00* (2006.01)
*C08K 3/10* (2006.01)
*G11B 11/105* (2006.01)

(52) U.S. Cl. .......... 523/200; 524/435; 428/332

(58) Field of Classification Search .......... 523/201, 523/200; 524/435; 427/127, 128; 252/182.33; 428/332

See application file for complete search history.

(56) References Cited

U.S. PATENT DOCUMENTS

| | | | |
|---|---|---|---|
| 3,947,376 A | 3/1976 | Albrecht | |
| 3,954,659 A | 5/1976 | O'Brien | |
| 4,026,819 A | 5/1977 | Langere et al. | |
| 4,169,337 A | 10/1979 | Payne | |
| 4,624,800 A | 11/1986 | Sasaki et al. | |
| 4,822,646 A | 4/1989 | Clark et al. | |
| 5,160,372 A | 11/1992 | Matrick | |
| 5,324,571 A | 6/1994 | Koyama et al. | |
| 5,342,597 A * | 8/1994 | Tunison, III | 423/335 |
| 5,366,660 A | 11/1994 | Tapley | |
| 5,389,582 A | 2/1995 | Loxley et al. | |
| 5,679,138 A | 10/1997 | Bishop et al. | |
| 5,693,784 A | 12/1997 | Ekenberg | |
| 5,788,738 A | 8/1998 | Pirzada et al. | |
| 5,851,507 A | 12/1998 | Pirzada et al. | |
| 5,855,951 A * | 1/1999 | Nelson et al. | 427/129 |
| 5,902,226 A | 5/1999 | Tasaki et al. | |
| 5,932,139 A | 8/1999 | Oshima et al. | |
| 5,984,997 A | 11/1999 | Bickmore et al. | |
| 6,083,859 A | 7/2000 | Mangold et al. | |
| 6,110,266 A | 8/2000 | Gonzalez-Blanco et al. | |
| 6,228,904 B1 | 5/2001 | Yadav et al. | |
| 6,344,271 B1 | 2/2002 | Yadav et al. | |
| 6,565,973 B2 | 5/2003 | Duff et al. | |
| 6,569,215 B2 * | 5/2003 | Miyata | 51/307 |
| 6,652,967 B2 | 11/2003 | Yadav et al. | |
| 6,656,241 B1 * | 12/2003 | Hellring et al. | 51/308 |
| 6,808,769 B2 | 10/2004 | Batz-Sohn et al. | |
| 6,832,735 B2 | 12/2004 | Yadav et al. | |
| 7,914,617 B2 * | 3/2011 | Yadav | 106/483 |
| 2002/0111024 A1 * | 8/2002 | Small et al. | 438/689 |
| 2002/0121156 A1 * | 9/2002 | Menzel et al. | 75/255 |
| 2002/0134027 A1 | 9/2002 | Lortz et al. | |
| 2002/0188052 A1 * | 12/2002 | Yadav et al. | 524/435 |
| 2003/0151029 A1 * | 8/2003 | Hsu et al. | 252/500 |
| 2003/0186634 A1 * | 10/2003 | Nishida et al. | 451/330 |
| 2004/0001925 A1 * | 1/2004 | Sharma et al. | 428/32.15 |

FOREIGN PATENT DOCUMENTS

EP 0976571 A1 2/2000

OTHER PUBLICATIONS

Untreated Fumed Silica, CAB-O-SIL M-5, Cabot Corporation, www.cabot-corp.com (2004).
Cabot, Untreated Fumed Silica, CAB-O-SIL M-5, Material Safety Data Sheet, pp. 1-6 (2000).

* cited by examiner

*Primary Examiner* — Vasu Jagannathan
*Assistant Examiner* — Hannah Pak

(57) ABSTRACT

Nanoparticle dispersions, inks, pastes, lotions and methods of their manufacture are disclosed. Multifunctional, nanocomposite, hollow nanoparticles, and coated nanoparticle dispersions are also discussed.

10 Claims, 1 Drawing Sheet

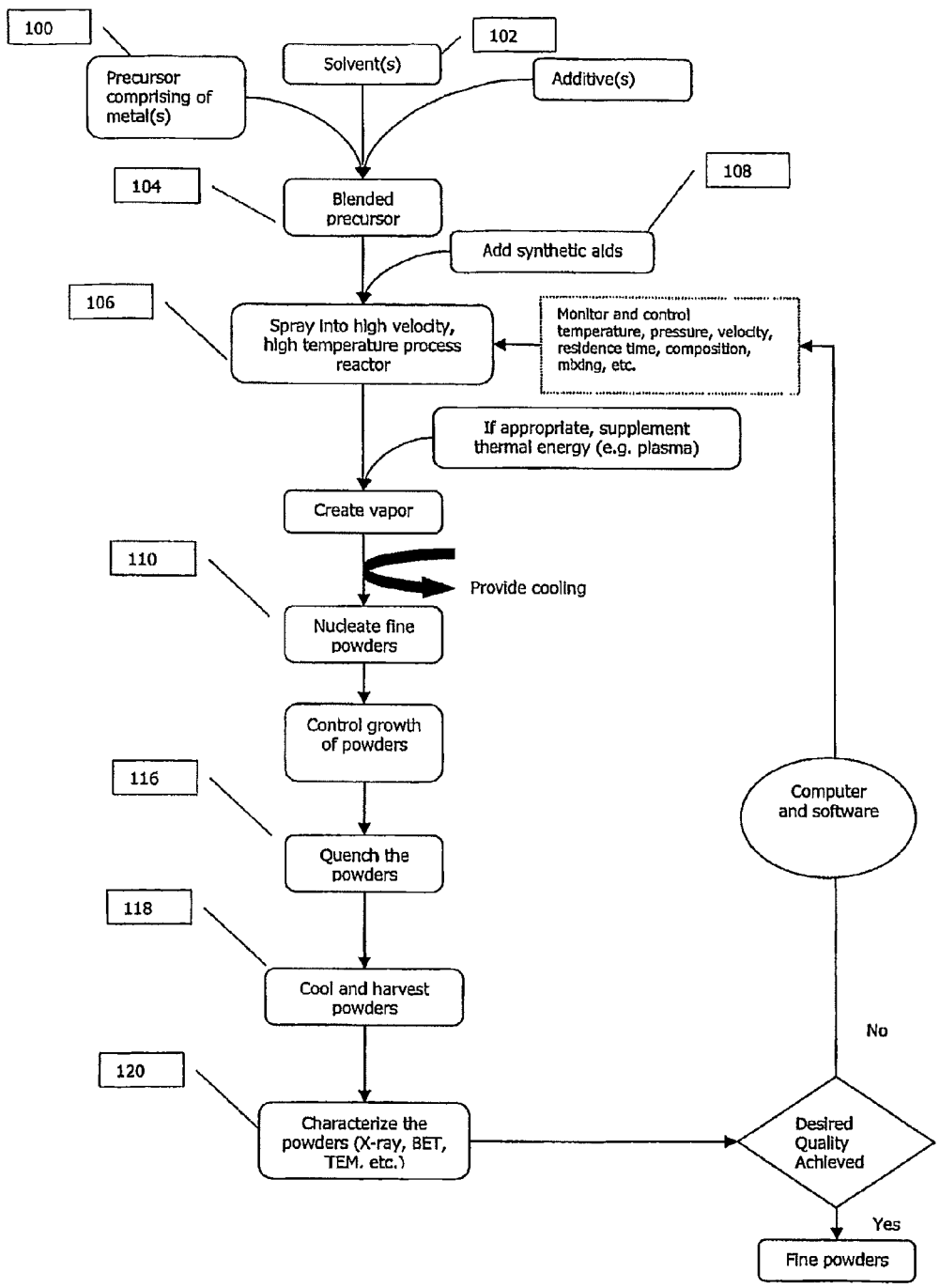

NANO-ENGINEERED INKS, METHODS FOR THEIR MANUFACTURE AND THEIR APPLICATIONS

CROSS REFERENCE TO RELATED APPLICATIONS

This application is a continuation patent application and claims the benefit of U.S. patent application Ser. No. 10/536,323, filed Oct. 7, 2005, U.S. Pat. No. 7,914,617, which is a national phase of International Patent Application Serial No. PCT/US2003/037635, filed Nov. 25, 2003, which claims the benefit of U.S. Provisional Patent Application Ser. No. 60/429,695, filed Nov. 27, 2002, and both applications are hereby incorporated by reference in its entirety.

BACKGROUND OF THE INVENTION

1. Field of the Invention

The present invention relates, in general, to dispersions, and, more particularly, to nano-engineered inks, methods to produce such inks, and their applications.

2. Relevant Background

Dispersions and inks are used in numerous applications. They are the building blocks of catalytic, electronic, electrical, magnetic, structural, optical, biomedical, chemical, thermal and consumer goods.

Inks are complex formulations that increasingly demand a balancing of often conflicting characteristics. Some of these characteristics include:

Particle size: Increasingly, inks that use sub-micron to nanoscale particles are desired. This is necessitated by ink jet heads and dots per inch (dpi) resolution requirements of the application. However, with increasingly smaller particles, a control of viscosity and prevention of flocculation becomes a challenging issue.

Particle density: For ceramic pigment-based lasting colors and in the case of metal inks, the particle density may be much higher than the solvent or medium they are dispersed in. In these cases, preventing particle settling down because of gravity and ensuring stability of the ink is often difficult.

Rheology: The rheology of dispersions is often very important to an application. Dispersions can be Newtonian or non-Newtonian. Rheology is often characterized through the viscosity, yield value, shear thinning and shear thickening properties of the dispersion. While pastes typically have higher viscosities (500 cP to 100000 cP), liquid inks typically have lower viscosities (the typical range is 5-150 cP). This means that particles used in the ink should have a size, shape and interconnectivity that enables appropriate viscosity.

Drying and Cure Rate: Drying and curing of a dispersion is often very important for applications. Some industrial applications require operational speeds in hundreds of feet per minute. Powders and ink formulations that impede these speeds or yield poor image are undesirable. Even in electronic and other device applications, faster cure of electrode ink or interconnect ink means better equipment utilization and superior productivity from labor and capital. There is a need for particle technology that serves this function. Fast cure times are often difficult to meet, because current low viscosity requirement necessitates the use of materials that cure slowly.

Pigment Wetting: Another important characteristic of inks is pigment wetting. This feature may be particularly important in durability applications. Therefore, powder engineering methods are desired that may be used to achieve reasonable pigment wetting combined with low viscosity.

Exterior Durability: Some applications desire very long durability, while others desire reasonable durability (in months). In particular, many pigments degrade in light or air or both with time. Powders used to formulate pastes or inks must meet appropriate exterior durability requirements.

Flexibility: The paste and ink formulations need to allow flexibility in the substrate they can be usefully applied to.

Adhesion: The formulation needs to adhere appropriately to the surface they are applied. In some cases, ease of cleaning and reuse may be desirable, while in others they need to last a long time.

VOC: In many applications, pastes and inks can cause environmental issues such as volatile organic compound (VOC) emissions when they are being used or cured or sintered. There is a need for formulations that reduce or eliminate VOC emissions.

Submicron powders and nanoscale powders offer opportunities to prepare novel dispersion (paste, ink) formulations. Nanopowders in particular, and sub-micron powders in general, are a novel family of materials whose distinguishing features include that their domain size is so small that size confinement effects become a significant determinant of the materials' performance. Such confinement effects can, therefore, lead to a wide range of commercially important properties. Nanopowders, therefore, are an extraordinary opportunity for design, development and commercialization of a wide range of devices and products for various applications. Furthermore, since they represent a whole new family of material precursors where conventional coarse-grain physiochemical mechanisms are not applicable, these materials offer unique combination of properties that can enable novel and multifunctional components of unmatched performance. Yadav, et al. in U.S. Pat. Nos. 6,228,904 and 6,344,271, which along with the references contained therein are incorporated herein by reference in their entirety, teach some applications of sub-micron and nanoscale powders.

SUMMARY OF THE INVENTION

The present invention is directed to dispersions in general and dispersions from nanoscale powders in particular. More specifically, the invention involves pastes and inks.

The powders used in this invention may be spherical, non-spherical, porous, tubular, planar, crystallites, amorphous, or any other useful form. The nanoparticles may similarly be one-dimensional, two-dimensional, or three-dimensional, spherical, non-spherical, porous, tubular, planar, crystallites, or amorphous forms, or any other useful form. The nanoparticles may be free flowing, agglomerated, porous, coated, or hollow forms or any other useful form. Some illustrative, but non-limiting applications, of such dispersions include (a) coatings and films; (b) catalysts; (c) electrodes; (d) interconnects (e) phosphors (f) information display or management; (g) markings, painting, photography and art (h) security (i) dopants and additives for electronic, magnetic, thermal, piezo, electrical, tooling, structural, paints, and topical health products.

BRIEF DESCRIPTION OF THE DRAWINGS

FIG. 1 shows an exemplary overall approach for producing fine powders for nano-engineered dispersions in accordance with the present invention.

DETAILED DESCRIPTION OF THE INVENTION

Definitions

Certain terms used to describe the invention herein are defined as follows:

"Fine powders" as used herein, refers to powders that simultaneously satisfy the following criteria:
(1) particles with mean size less than 10 microns; and
(2) particles with aspect ratio between 1 and 1,000,000.

For example, in some embodiments, the fine powders are powders that have particles with a mean domain size less than 5 microns and with an aspect ratio ranging from 1 to 1,000,000.

"Submicron powders" as used herein, refers to fine powders that simultaneously satisfy the following criteria:
(1) particles with mean size less than 1 micron; and
(2) particles with aspect ratio between 1 and 1,000,000.

For example, in some embodiments, the submicron powders are powders that have particles with a mean domain size less than 500 nanometers and with an aspect ratio ranging from 1 to 1,000,000.

The terms "nanopowders," "nanosize powders," "nanoparticles," and "nanoscale powders" are used interchangeably and refer to fine powders that simultaneously satisfy the following criteria:
(1) particles having a mean size less than 250 nanometers; and
(2) particles with an aspect ratio between 1 and 1,000,000.

For example, in some embodiments, the nanopowders are powders that have particles with a mean domain size less than 100 nanometers and with an aspect ratio ranging from 1 to 1,000,000.

Pure powders, as the term used herein, are powders that have composition purity of at least 99.9% by metal basis. For example, in some embodiments the purity is 99.99%.

"Domain size," as that term is used herein, refers to the minimum dimension of a particular material morphology. In the case of powders, the domain size is the grain size. In the case of whiskers and fibers, the domain size is the diameter. In the case of plates and films, the domain size is the thickness.

The terms "powder," "particle," and "grain" are used interchangeably and encompass oxides, carbides, nitrides, borides, chalcogenides, halides, metals, intermetallics, ceramics, polymers, alloys, and combinations thereof. The term includes single metal, multi-metal, and complex compositions. These terms further include hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric forms or substances. Further, the term powder in its generic sense includes one-dimensional materials (fibers, tubes), two-dimensional materials (platelets, films, laminates, planar), and three-dimensional materials (spheres, cones, ovals, cylindrical, cubes, monoclinic, parallelolipids, dumbbells, hexagonal, truncated dodecahedron, irregular shaped structures, etc.).

The term "aspect ratio" refers to the ratio of the maximum to the minimum dimension of a particle.

"Precursor," as the term used herein encompasses any raw substance that can be transformed into a powder of same or different composition. In certain embodiments, the precursor is a liquid. The term precursor includes, but is not limited to, organometallics, organics, inorganics, solutions, dispersions, melts, sols, gels, emulsions, or mixtures.

"Powder", as the term used herein encompasses oxides, carbides, nitrides, chalcogenides, metals, alloys, and combinations thereof. The term includes hollow, dense, porous, semi-porous, coated, uncoated, layered, laminated, simple, complex, dendritic, inorganic, organic, elemental, non-elemental, dispersed, composite, doped, undoped, spherical, non-spherical, surface functionalized, surface non-functionalized, stoichiometric, and non-stoichiometric form or substance.

"Coating" (or "film" or "laminate" or "layer"), as the term is used herein encompasses any deposition comprising submicron and nanoscale powders. The term includes in its scope a substrate or surface or deposition or a combination that is hollow, dense, porous, semi-porous, coated, uncoated, simple, complex, dendritic, inorganic, organic, composite, doped, undoped, uniform, non-uniform, surface functionalized, surface non-functionalized, thin, thick, pretreated, post-treated, stoichiometric, and non-stoichiometric form or morphology.

"Dispersion", as the term used herein encompasses inks, pastes, creams, lotions, Newtonian, non-Newtonian, uniform, non-uniform, transparent, translucent, opaque, white, black, colored, emulsified, with additives, without additives, water-based, polar solvent-based, or non-polar solvent-based mixture of powder in any fluid or fluid-like state of substance.

To practice the teachings herein, nanoparticles and submicron particles can be produced by any technique. The preferred techniques included herein and identified by reference to other patents and patent applications are provided as examples to ease understanding and implementation of the invention.

In some embodiments of the present invention, nanoscale powders are prepared from environmentally benign, safe, readily available, high metal loading, lower cost fluid precursors as shown generally in FIG. 1. The precursor used in operation 101 may be a gas, sol, single-phase liquid, multiphase liquid such as emulsions, a melt, fluid mixtures, solids and combinations thereof. Illustrations of precursors include, but are not limited to, metal acetates, metal carboxylates, metal ethanoates, metal alkoxides, metal octoates, metal chelates, metallo-organic compounds, metal halides, metal azides, metal nitrates, metal sulfates, metal 'hydroxides, metal salts soluble in organics or water, metal containing emulsions. Multiple metal precursors may be mixed if complex powders are desired.

Optionally, precursor 101 is purified by any available technique. Whether a precursor 101 benefits from purification depends on the application and on the original purity of the precursor 101. Another optional, application-specific operation is shown by the addition of synthesis aids in 107. Synthesis aids may be used to affect physical, chemical, or solid state properties of the powder produced. Synthesis aids 107 may also act as catalysts or buffers or species that impact the heat transfer, mass transfer, momentum transfer in the process of producing powders.

In some embodiments, once the desired precursor is available, it is processed at high temperatures in 103 to form the powder 104. Products such as powders 104 produced from these precursors are pure (i.e., having a high degree of homogeneity of one or more desired properties such as particle size, particle composition, stoichiometry, particle shape, and the like). It is important that the method of producing the product and the environment in which these products are produced are pure and compatible with the chemistry involved. In some embodiments, processing may occur at velocities greater than 0.25 mach.

The high temperature processing is conducted at step 103 at temperatures greater than 1000 K, in certain embodiments above 2000 K, in certain embodiments above 3000 K, and in certain embodiments above 4000 K. Such temperatures may be achieved by any method such as, but not limited to, plasma processes, combustion, pyrolysis, electrical arcing, and combinations of such steps in an appropriate reactor. The plasma may provide reaction gases or just provide a clean source of heat. The process is in certain embodiments operated below ambient pressures achieved using a vacuum pump, eductor or any other principle (higher pressures may be employed in certain embodiments). In some embodiments, the feed is atomized and sprayed in a manner that enhances heat transfer efficiency, mass transfer efficiency, momentum transfer efficiency, and reaction efficiency. Method and equipment such as those taught in U.S. Pat. Nos. 5,788,738, 5,851,507, and 5,984,997 and U.S. patent application Ser. Nos. 10/004,387 and 10/113,315 (all of which are hereby incorporated by reference in their entirety) are illustrations of various ways the teachings herein can be practiced.

In some embodiments, the high temperature processing method includes instrumentation that can assist the quality control. The reactor environment and the species composition are controlled with a reasonable degree of precision to ensure reaction conditions that favor a combination of series and parallel reactions needed to produce particles of desired composition, size and other characteristics. Furthermore, in some embodiments, the process is operated to produce fine powders 104, in certain embodiments submicron powders, and in certain embodiments nanopowders. The gaseous products from the process may be monitored for composition, temperature and other variables to ensure quality at 105. The gaseous products may be recycled at step 106 or used as a valuable raw material when the powders 108 have been formed as determined at step 106 in an integrated manufacturing operation.

Once the product fine powders 108 have been formed, they may be quenched to lower temperatures to prevent agglomeration or grain growth using methods such as, but not limited to, methods taught in U.S. Pat. No. 5,788,738. In some embodiments, methods may be employed that can prevent deposition of the powders on the conveying walls. These methods may include, but are not limited to, electrostatic, blanketing with gases, higher flow rates, mechanical means, chemical means, electrochemical means, or sonication/vibration of the walls.

The product fine powders may be collected by any method. Some illustrative approaches without limiting the scope of this invention are bag filtration, electrostatic separation, membrane filtration, cyclones, impact filtration, centrifugation, hydrocyclones, thermophoresis, magnetic separation, and combinations thereof.

Preparing Nanoparticle Ink:

In certain embodiments, once nanoparticles of desired composition and characteristics are available, they are first deagglomerated such that the mean size of the agglomerate is equal to or less than twenty times (in certain embodiments equal to or less than ten times, in certain embodiments equal to or less than five times, and in certain embodiments equal to or less than three times) the primary particle (crystallite) size as determined by Warren-Averbach analysis of X-ray spectra for the particles. The deagglomerated powders are then optionally treated to either remove surface adsorbed species or add surface species or both. Methods for such treatment include, but are not limited to, one or more of the following (a) heat treatment at high pressures, ambient pressures and vacuum using inert, oxidizing or reducing atmospheres; (b) chemical treatment at suitable pressures, temperatures, times, and fluid phases; (c) mechanical treatment such as those in milling, microchannels, homogenizers, and any method of applying fluid dynamic effects in general and shear forces in particular. Such treatments are useful and help ease the dispersion of nanoparticles and engineer the characteristics of the dispersions including those based on water, organic solvents, inorganic solvents, melts, resins, monomers, any type of fluid and such. Other methods of treatment would be obvious and readily available to one of ordinary skill in the art and may be employed depending on the results desired.

In some embodiments, heat treatment of nanopowders may be at temperatures less than 75% of the melting point of the substance, in other embodiments at temperatures less than 50% of the melting point of the substance, and in still further embodiments at temperatures less than 25% of the melting point of the substance. If the melting point is unknown or as a generic guideline, the heat treatment may be done between 100 to 400° C. and in other embodiments between 175 to 300° C. under air or gas flow. In certain embodiments, the heat treatment may be done between 400 to 800° C. and in other embodiments between 750 to 1200° C. under air flow or gas flow. The heat treatment may be done in vacuum or ambient pressure or under pressure or under supercritical conditions, in air, pure oxygen, carbon dioxide, nitrogen, argon, hydrogen containing, inert, halogen containing, organic vapor containing, or other suitable chemical environment. It is to be noted that in certain embodiments, the melting point of the nanoparticle is surprisingly lower than the melting of coarse powder of the same composition.

If chemical treatment is employed, the chemical environment of the treatment media may be monitored and refreshed appropriately to reflect the changes in the media from the reaction products. Specific illustration of the media properties that can be monitored depends on the fluid phase and can optionally include one or more of the following—pH, temperature, zeta potential, conductivity, flocculate size, optical absorption characteristics, nanoparticle loading, chemical composition. In certain embodiments, the chemical treatment of nanoparticles is done between a pH of about 0.5 and about 13, in certain embodiments between a pH of 2 to 5, and in certain embodiments it is done between a pH of 8 and 11.

The deagglomerated and surface treated nanoscale powders are then mixed into a suitable solvent. Illustration of suitable solvents include, but are not limited to, regular or high purity water, methanol, ethanol, iso-propyl alcohol, octane, dodecane, heptane, hexane, acetone, gasoline, butyl acetate, DOWANOL®, glycol, glycerol, phenol, acrylates, epoxies, aliphatic hydrocarbons, aromatic hydrocarbons, alcohols, aldehydes, ketones, ethers, acids, amines, quarternary compounds, alkalis, terpenols, liquids with boiling point greater than 400 K, ionic liquids, molten polymers, monomers, oils, silicones, and combinations thereof. The mixing step can be accomplished by any technique. Illustrations of mixing techniques include, but are not limited to, stirring, sonication, sparging, milling, shaking, centrifugal circulating pump mixing, blade mixing, impact mixing, jet mixing, homogenization, co-spraying, fluid flow through channels with dimensions less than 1000 microns (in certain embodiments less than 250 microns, in certain embodiments less than 100 microns, and in certain embodiments less than 100 times the mean particle size of the powders). In certain embodiments, high to very high shear rates applied over short periods of time can lead to superior dispersions. The dispersion manufacturing steps and process may be automated with computers and software to achieve superior reproducibility and to lower variability.

In certain embodiments, the dispersion manufacturing step includes filtration. The filters may be constructed of polypropylene, Teflon®, cellulose, polymeric, silicon-based, porous ceramic, porous metal, anodized porous substrate, porous carbon, porous wood, membrane or other media. The filters may be uniform or may employ gradient structure of pores.

The term filter rating of a filter depends on the pore size, pore size distribution and pore arrangement; the term refers to the maximum particle size in the dispersion that passes through the filter into the filtrate. In certain embodiments, filters with a filter rating less than 3 microns are employed. In certain embodiments, filters with a filter rating less than 1 micron are employed. In certain embodiments, filters with a filter rating less than 0.5 micron are employed. In certain embodiments, filters with a filter rating less than 250 nanometers are employed. In certain embodiments, filters with a filter rating less than 100 nanometers are employed. In certain embodiments, the gradient structure of the filters may be used wherein the gradient refers to reducing the average diameter of the filter pores in the direction of flow. In other embodiments, a multi-layered structure of filters may be used wherein the layered structure has a reducing average diameter of the filter pores as one proceeds through layers in the direction of flow. In other embodiments, multiple filters may be used in series wherein coarser filters precede the filters with filter rating for smaller particle size. The filters may be regenerated, activated, pressurized or used in various manners. The filters may be in-line filters or of other configurations. The filters may be back-flushable or disposable or washable. Filters can be used by any methods known to filtration community. For example, the filters may be used in combination with pumps wherein the pump pressurizes the dispersion and causes it to flow through the filter. In applications where upper particle limits are desired, filtration is particularly useful.

In certain embodiments wherein the dispersion (e.g. ink) needs to dry fast, lower boiling and high vapor pressure solvents are generally recommended. Additionally, additives that assist drying by oxidation may be added to the dispersion. Illustrative examples of such additives include, but are not limited to, soaps of metals such as manganese and cobalt and other metals with organic acids.

If it were important to prevent or slow down the drying of a dispersion with time, low vapor pressure solvents or ionic liquids may be used. Premature oxidation of inks may be retarded by adding antioxidants such as ionol, eugenol, and other compounds.

Additional additives may be added to modify the characteristics of a nanoparticulate ink. For example, waxes may be added to improve slip resistance, scuff resistance, or modify the rheology. Lubricants, defoamers, surfactants, thickeners, preservatives, biocides, dyes, commercially available ink vehicles, catalysts and gellants may be added to achieve a combination of properties needed by the end application. For dispersion stability, salts and pH modifiers may be used. One of ordinary skill in the art may readily choose additional additives depending on the desired characteristics of the nanoparticulate ink.

For systematic development and manufacturing of the dispersion, the particle size distribution, dispersion's zeta potential, pH and conductivity may be monitored and modified.

Rheology is affected by the choice of the solvent and additives—therefore appropriate consideration must be placed to the specific selections. In addition, the nanoparticles and their inter-particle structure significantly impact the dispersion rheology. Chain like aggregated structure that is commonly found with certain fumed silica or carbon black leads to higher viscosity. Similarly, flocculation related linking of particles can increase the viscosity. In certain embodiments of this invention, one determines the average packing number of the particle aggregates by the equation $$P = (1/N_p)*(D^3/d_p^3)$$

Where, P=average packing number; $N_p$=average number of particles per aggregate; D=average diameter of the aggregate; $d_p$=average particle diameter To practice this aspect of the current invention, the terms in the above equation may be indirectly estimated and/or experimentally determined using various techniques such as high resolution transmission electron microscopy.

The average packing number is useful since it is correlated with the rheology of the dispersion. In certain embodiments, nanoparticles with average particle diameter less than 100 nanometer are prepared with surface characteristics such that when these nanoparticles are dispersed, the average packing number of the nanoparticles in the dispersion as defined above is less than or equal to 1000, in certain embodiments less than 100, in certain embodiments less than 10, and in certain embodiments less than 5. In dispersions and inks that seek low viscosity, the average packing number should be as low as feasible and affordable. Another way to implement this guideline is to reduce the hydrodynamic radii of the soft or hard aggregate to minimize the shape's contribution to fluid viscosity.

Teachings above enable one to prepare nano-inks in particular and nano-dispersions in general. In certain embodiments, dispersions comprising nanoparticles at loadings greater than 5 weight % and with a viscosity less than 50 cP are readily achieved. In certain embodiments, dispersions comprising nanoparticles at loadings greater than 10 weight % and with a viscosity less than 200 cP are readily achieved. In certain embodiments, dispersions comprising nanoparticles at loadings greater than 20 weight % and with a viscosity less than 500 cP are readily achieved. In certain embodiments, dispersions comprising nanoparticles at loadings greater than 40 weight % and with a viscosity less than 2000 cP are readily achieved.

In yet other embodiments, dispersions comprising nanoparticles at loadings greater than 5 weight % and with a viscosity less than 250 cP are readily achieved. In other embodiments, dispersions comprising nanoparticles at loadings greater than 10 weight % and with a viscosity less than 500 cP are readily achieved. In other embodiments, dispersions comprising nanoparticles at loadings greater than 20 weight % and with a viscosity less than 1000 cP are readily achieved. In other embodiments, dispersions comprising nanoparticles at loadings greater than 40 weight % and with a viscosity less than 10000 cP are readily achieved.

Nanoparticles used for this invention may be of any composition. In certain embodiments, the nanoparticle composition comprises at least one element selected from aluminum, arsenic, barium, bismuth, cadmium, calcium, cerium, cesium, cobalt, copper, dysprosium, erbium, europium, gadolinium, gallium, gold, hafnium, hydrogen, indium, iridium, iron, lanthanum, lithium, magnesium, manganese, mendelevium, mercury, molybdenum, neodymium, neptunium, nickel, niobium, osmium, palladium, platinum, potassium, praseodymium, promethium, protactinium, rhenium, rubidium, scandium, silicon, silver, sodium, strontium, tantalum, terbium, thallium, thorium, tin, titanium, tungsten, vanadium, ytterbium, yttrium, zinc, and zirconium. In certain embodiments, the nanoparticle composition comprises polymers and organic substances.

Nanoparticles synthesized by various techniques can yield a particle surface that may not readily associate with the solvent and these nanoparticles may not disperse easily. In these circumstances, it is recommended that the surface state and functional groups on the particles be identified by techniques such as x-ray photocorrelation spectroscopy (XPS) and infrared methods such as FTIR. This insight can then be used to determine potential reagents that can be used to react with the surface to yield a surface that has been functionalized with suitable functional groups. These functional groups are expected to enhance the dispersability of the powders. For example, if a ceramic powder was covered with hydroxide groups, condensation reactions with organic acids can potentially make the particle surface functionalized with organic groups. These groups can help disperse the powder in a suitable organic solvent. In certain embodiments, the nanoparticles are functionalized or coated with a substance that increases the solvation of the particle in the desired solvent.

Particles of high density can be difficult to disperse. In certain embodiments, low density particles or hollow particles are utilized to address this challenge. This can be accomplished by coated nanocomposite type particles (core-shell) wherein the core particle is less than 1 micron and is of a density less than 2 gm/cc, while the shell is prepared from the desired high density substance (i.e. greater than 2 gm/cc). As a non-limiting illustration, the shell may be made of a metal (tungsten, copper) or high density ceramic (titania, tungsten carbide) while the core may be made of polymer (polyacrylates, polyethylene, polypropylene, polyimide, polycarbonate, polystyrene, Teflon, polyurethane). The surprising opportunity offered by these coated nanocomposite particles is that they feature low effective density which reduces the tendency to settle because of gravity. In addition, these nanocomposite particles are significantly more affordable given the low cost of polymers. In extreme cases, hollow nanoparticles may be utilized to create very low density particles. In these particles, the core of the particle may be air or some encapsulated solvent or substance. Such particles offer lower thermal conductivity, lower dielectric constants, low density, low thermal mass and numerous other commercially desirable properties.

Color, electromagnetic and electrochemical properties, and ability to last in applications are important determinants in several dispersion applications. In certain embodiments, oxide materials are used to prepare dispersions. However, dye activated oxide particles or non-oxide particles may be used.

Finally, nanoparticles offer multifunctional properties. For example, nanoparticles can be the basis for high resolution color pigments and also serve as a catalyst or electromagnetic particle for security applications. An innovative feature of this invention is the discovery that nanoparticles can uniquely combine one or more of such multifunctional features in an ink. Some illustrations include (a) color and catalytic activity; (b) color and electromagnetic signature; (c) catalytic activity and electromagnetic signature; (d) electrical conductivity and color; and (e) electrical conductivity and catalytic activity.

Dispersions have numerous applications in industries such as, but not limited to, color, cosmetics, printing, catalysis, biomedical, pharmaceuticals, sensor, electronic, telecom, optics, electrical, photonic, thermal, piezo, magnetic and electrochemical products.

In examples below, unless otherwise mentioned, % loading refers to loading of nanoparticles on weight % basis.

EXAMPLE 1

Rutile titania nanoparticle of average size 15 nanometers were coated on 6 micron PMMA. The coated particles were white and of optical property similar to rutile titania; however, the effective density of the composite particles was less than that of the pure rutile titania. The titania coated particles were mixed with water using a sonicator resulting in a 5% by weight dispersion. No additives were needed to achieve a stable dispersion.

EXAMPLE 2

Rutile titania nanoparticle of average size 15 nanometers were coated on 500 nanometer PMMA. The coated particles were white and of optical property similar to rutile titania; however, the effective density of the composite particles was less than that of the pure rutile titania. The titania coated particles were mixed with a high shear mixer using a sonicator resulting in a 5% by weight dispersion.

EXAMPLE 3-10

Aluminum silicon oxide was produced from a precursor mix comprising aluminum octoate and octamethyltetracyclosiloxane (mixed to achieve a relative ratio of 77.2 mol % Si to 22.8 mol % Al). The precursor mix was fed into a thermal reactor at a feed rate of 0.79 gallons per hour. The thermal reactor combined combustion and a DC argon plasma in series. The peak operating temperature was above 3500 K. The nanoparticles were quenched using Joule-Thompson quench method. The powders were harvested using a polymer filter bag. The harvested powders were heat treated at 250 C for 2 hours and then dispersed in water at different loadings using a ultrasonic sonicator and the following dispersants—0.4% BYK-022®, 4% Uniquat®, 0.1% Witconate 90®. The dispersion was allowed to settle for 1 to 24 hours and then the dispersion characteristics were studied. It was seen that all dispersions were stable with time. A high resolution transmission electron microscopy study confirmed that average packing number for the dispersed nanoparticles was less than 100. The following results were seen

|  | Aqueous Dispersion | |
|---|---|---|
|  | loading (%) | viscosity (cP) |
| Example 3 | 0.0 | 1.9 |
| Example 4 | 2.0 | 1.6 |
| Example 5 | 5.0 | 3.2 |
| Example 6 | 10.0 | 5.1 |
| Example 7 | 20.0 | 7.0 |
| Example 8 | 30.0 | 10.4 |
| Example 9 | 40.0 | 29.6 |
| Example 10 | 45.1 | 70.0 |

These examples demonstrate that water based nano-inks with viscosities less than 150 cP can be readily manufactured using the teachings herein. Additionally, these examples show that inks of multi-metal oxide compositions can now be produced. The low viscosities are surprising and impressive, given that it is known is the art that the commonly available fumed silica-based ink exhibit very high viscosities (over 10 times the values observed above, particularly above 20 weight % loadings of nanoparticles).

EXAMPLE 11-18

As in examples 3-10, aluminum silicon oxide was produced from a precursor mix comprising aluminum octoate and octamethyltetracyclosiloxane (mixed to achieve a relative ration of 77.2 mol % Si to 22.8 mol % Al). The precursor mix was fed into a thermal reactor at a feed rate of 0.79 gallons per hour. The thermal reactor combined combustion and a DC argon plasma in series. The peak operating temperature was above 3500 K. The nanoparticles were quenched using Joule-Thompson quench method. The powders were harvested using a polymer filter bag. The harvested powders were heat treated at 250° C. for 2 hours and then dispersed in an alcohol (Iso-propyl alcohol, IPA) at different loadings using a ultrasonic sonicator and the following dispersants—3% BYK-9077®. The dispersion was allowed to settle for 1 to 24 hours and then the dispersion characteristics were studied. It was seen that all dispersions were stable with time. A high resolution transmission electron microscopy study confirmed that average packing number for the dispersed nanoparticles was less than 100. The following results were seen (viscosity was measured with Brookfield Viscometer).

|  | IPA Dispersion | |
| --- | --- | --- |
|  | loading (%) | viscosity (cP) |
| Example 11 | 0.0 | 2.1 |
| Example 12 | 2.0 | 2.3 |
| Example 13 | 5.0 | 2.5 |
| Example 14 | 10.0 | 3.5 |
| Example 15 | 20.0 | 6.2 |
| Example 16 | 30.0 | 15.8 |
| Example 17 | 40.0 | 82.7 |
| Example 18 | 46.6 | 576.2 |

These examples demonstrate that solvent based nano-inks with viscosities less than 600 cP can be readily manufactured using the teachings herein. Additionally, these examples show that solvent-based inks of multi-metal oxide compositions can now be produced. The low viscosities are once again surprising and impressive, given that it is known in the art that the commonly available fumed silica-based ink exhibit very high viscosities (over 10 times the values observed above, particularly above 20 weight % loadings of nanoparticles).

EXAMPLE 19

Silver powders were produced from silver nitrate using the process described in examples above and teachings herein. The silver powders were seen to have an X-ray determined crystallite size less than 30 nanometers. These particles were readily dispersed in water yielding a 0.5% loading of the silver powders. A high resolution transmission electron microscopy study confirmed that average packing number for the dispersed nanoparticles was less than 1000. This example demonstrates that metal powders can be dispersed.

EXAMPLE 20

Cerium oxide powders were produced from cerium octoate using the process described in examples above and teachings herein. The cerium oxide powders were seen to have a X-ray determined crystallite size less than 10 nanometers. These particles were heat treated below 400° C. and these then readily dispersed in distilled water using a sonicator, without any dispersant or surface stabilizing agent, yielding a 8% loading of the cerium oxide powders in a stable dispersion, viscosity less than 500 cP, a pH less than 5.0 and conductivity less than 500 microS/cm. Without the heat treatment, the cerium oxide gave lower % loading and a different pH. A high resolution transmission electron microscopy study confirmed that average packing number for the dispersed cerium oxide nanoparticles was less than 10. This example demonstrates that rare earth oxide nanoscale materials can be dispersed to prepare ink. This example also demonstrates the value of heat treatment of nanoparticles before dispersion preparation.

EXAMPLE 21

Calcium silicon oxide (10 mol % Ca to 90 mol % Si) powders were produced from calcium octoate and a siloxane precursor using the process described in examples above and teachings herein. The powders were seen to have a BET surface area determined size less than 100 nanometers. These particles were readily dispersed in distilled water using a sonicator, without any dispersant, yielding a paste like consistency. This example demonstrates that nanoscale materials can be dispersed to prepare pastes.

EXAMPLE 22

Cobalt aluminum oxide (33.3 mol % Co to 66.7 mol % Al) powders were produced from cobalt octoate and OM Group Inc.'s Aluminum AOC® precursor using the process described in examples above and teachings herein. These particles were heated to various temperatures between 800° C. to 1250° C. in air and observed to exhibit a beautiful blue color. The powders heated to 800° C. were analyzed and found to have a BET surface area determined equivalent powder size less than 40 nanometers. The nanoparticles readily dispersed in distilled water using a sonicator, without any dispersant, yielding a low viscosity blue ink. A high resolution transmission electron microscopy study confirmed that average packing number for the dispersed blue nanoparticles was less than 100. This example demonstrates that nanoscale pigment materials can be dispersed to prepare inks. The ink was then applied to a surface using a paint brush and dried left a bright blue image. The wetting of the ink on paper was as good as commercially available inks, drying rate was fast, adhesion of pigment excellent, and the no defects were detectable in the image resolution to the eye suggesting a high dots per inch image is achievable with nanoparticles.

EXAMPLE 23

Iron oxide powders were produced from iron octoate precursor using the process described in examples above and teachings herein. These particles were heated to 200° C. in air and observed to exhibit a reddish-brown color. The powders were analyzed and found to have a X-ray determined crystallite size less than 25 nanometers. The nanoparticles readily dispersed in isopropyl alcohol using a sonicator, yielding a low viscosity magnetic ink. This example demonstrates that nanoscale electroceramic materials can be dispersed in solvents to prepare inks. Given the color of the powder and corresponding ink, this example also illustrates multifunctional inks (i.e. ink offering in this case, both color and magnetic functionality).

EXAMPLE 24

Zirconium oxide powders were produced from zirconium Hex-Cem® precursor (OM Group Inc.) using the process described in the examples above and teachings herein. These particles were heated to 250° C. in air. The powders were analyzed and found to have a X-ray determined crystallite size less than 15 nanometers. The nanoparticles readily dispersed in butyl acetate using a sonicator, yielding a low viscosity zirconia nano-ink. This example demonstrates that ceramic nanomaterials can be dispersed in solvents to prepare inks.

Other embodiments of the invention will be apparent to those skilled in the art from a consideration of the specification or practice of the invention disclosed herein. It is intended that the specification and examples be considered as exemplary only, with the true scope and spirit of the invention being indicated by the claims.

What is claimed is:

1. A dispersion comprising coated nanoparticles having an average particle size of less than 100 nanometers, wherein the coated nanoparticles comprise a core particle having a density less than 2 gm/cc and a shell that is prepared from a substance having a density greater than 2 gm/cc, wherein the core particle comprises polyacrylates, polyethylene, polypropylene, polyimide, polycarbonate, polystyrene, polytetrafluoroethylene, polyurethane, or polymethyl-methacrylate.

2. The dispersion according to claim 1, wherein the shell comprises a metal.

3. The dispersion according to claim 2, wherein the shell comprises tungsten or copper.

4. The dispersion according to claim 1, wherein the shell comprises a high density ceramic.

5. The dispersion according to claim 4, wherein the shell comprises titania and/or tungsten carbide.

6. The dispersion according to claim 1, wherein the core particle is polymethyl-methacrylate and the shell comprises rutile titania.

7. The dispersion according to claim 6, wherein the average particle size of the rutile titania is 15 nanometers.

8. The dispersion according to claim 1, wherein the coated nanoparticles are low density.

9. The dispersion according to claim 1, wherein the dispersion comprises coated nanoparticles at a loading greater than 10wt. % and a viscosity less than 200 cp.

10. The dispersion according to claim 1, wherein the dispersion is an ink.

* * * * *